United States Patent
Noble et al.

(10) Patent No.: US 12,284,228 B1
(45) Date of Patent: Apr. 22, 2025

(54) VIRTUALLY SHARING CONTENT AS ANNOTATIONS ONTO A PHYSICAL SURFACE OVER MULTIPLE SESSIONS

(71) Applicant: Zoom Communications, Inc., San Jose, CA (US)

(72) Inventors: Thomas William Noble, Murfreesboro, TN (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/329,257

(22) Filed: Jun. 5, 2023

(51) Int. Cl.
*H04L 65/401* (2022.01)
*G06F 3/14* (2006.01)

(52) U.S. Cl.
CPC ........ *H04L 65/4015* (2013.01); *G06F 3/1454* (2013.01)

(58) Field of Classification Search
None
See application file for complete search history.

(56) References Cited

U.S. PATENT DOCUMENTS

| | | |
|---|---|---|
| 8,275,197 B2 | 9/2012 | Hawkins et al. |
| 8,982,066 B2 | 3/2015 | Schwartz et al. |
| 9,052,745 B2 | 6/2015 | Hill et al. |
| 9,053,455 B2 | 6/2015 | Barrus |
| 9,641,570 B2 | 5/2017 | Knodt et al. |
| 9,851,895 B2 | 12/2017 | Dwang et al. |
| 9,858,552 B2 | 1/2018 | Kowalkiewicz et al. |
| 10,269,137 B2 | 4/2019 | Natori et al. |

(Continued)

FOREIGN PATENT DOCUMENTS

| | | | | |
|---|---|---|---|---|
| JP | H0865432 A | * | 3/1996 | |
| WO | 2019023321 A1 | | 1/2019 | |
| WO | WO-2023009124 A1 | * | 2/2023 | ............. H04N 7/147 |

OTHER PUBLICATIONS

Webex Help Center, Use the whiteboard on Board and Desk Series, https://help.webex.com/en-us/article/zfhy55/Use-the-whiteboard-on-Board-and-Desk-Series, Mar. 6, 2023, 7 pages.

(Continued)

*Primary Examiner* — Chris Parry
*Assistant Examiner* — Abderrahmen Chouat
(74) *Attorney, Agent, or Firm* — Young Basile Hanlon & MacFarlane, P.C.

(57) ABSTRACT

The present teachings provide a method and device of virtually sharing physical contents across multiple sessions. The teachings provide retrieving, from a data store, virtual whiteboard content derived from a first whiteboard session. The virtual whiteboard content includes first physical data from a physical surface, first virtual data from a virtual whiteboard, first metadata corresponding to one or both of the first virtual data or the first physical data. The virtual content is categorized based on the first metadata. The categorized virtual content is transmitted as an image stream according to the retrieved virtual whiteboard content to a client device in a location of the physical surface to cause the image stream to be presented on the physical surface or a second physical surface during a second whiteboard session. The data store is updated with second content elements obtained from the physical surface during the second whiteboard session.

20 Claims, 9 Drawing Sheets

(56) References Cited

U.S. PATENT DOCUMENTS

| | | | |
|---|---|---|---|
| 10,547,768 B2 | 1/2020 | Bostick et al. | |
| 11,206,294 B2 | 12/2021 | Kulbida | |
| 11,245,871 B1 | 2/2022 | Gandhi et al. | |
| 11,790,572 B1* | 10/2023 | Oulès | G06T 11/00 |
| | | | 345/204 |
| 2011/0208807 A1* | 8/2011 | Shaffer | G06F 3/0418 |
| | | | 709/205 |
| 2015/0169069 A1* | 6/2015 | Lo | H04L 65/403 |
| | | | 715/753 |
| 2018/0232192 A1* | 8/2018 | Timoner | G09G 5/12 |
| 2019/0037171 A1* | 1/2019 | Nagpal | H04N 7/147 |
| 2019/0260964 A1* | 8/2019 | Nagpal | G06F 3/048 |
| 2020/0348900 A1* | 11/2020 | Zhang | G06F 40/171 |

OTHER PUBLICATIONS

Webex Help Center, Use the whiteboard in meetings, https://help.webex.com/en-us/article/nytdb92/Use-the-whiteboard-in-meetings, Feb. 28, 2023, 4 pages.

\* cited by examiner

VIRTUALLY SHARING CONTENT AS ANNOTATIONS ONTO A PHYSICAL SURFACE OVER MULTIPLE SESSIONS

FIELD

This disclosure relates to virtual whiteboards, and, more specifically, to converting contents on a physical surface into a virtual whiteboard so that annotations are available in a physical space and a virtual space and then reproducing at least some of the content in subsequent sessions.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
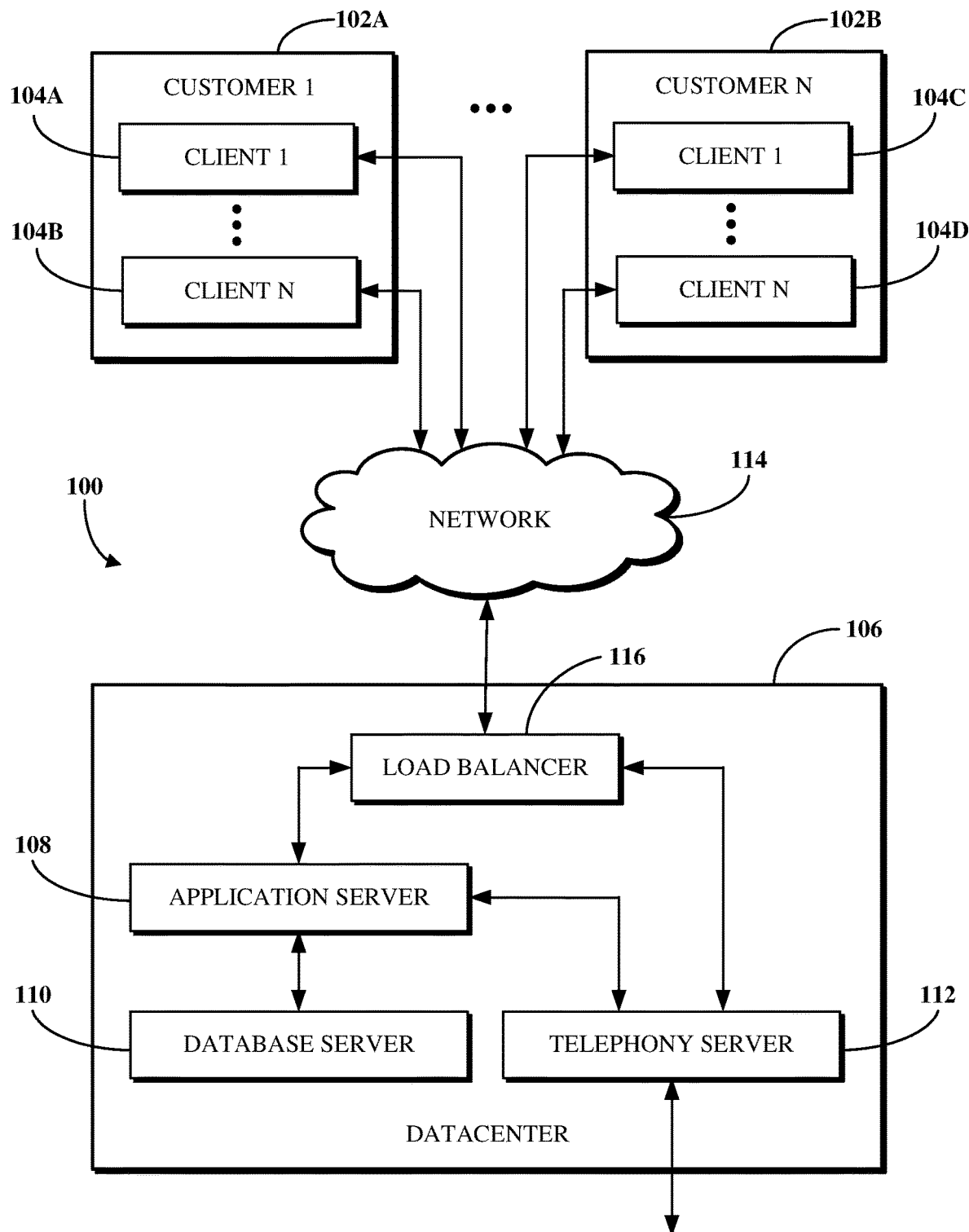
FIG. 1 is a block diagram of an example of an electronic computing and communications system.

A physical surface is a surface on which markings (e.g., writings and/or drawings) may be added, removed, and/or modified by a person or thing. The physical surface may in at least some cases be free of power, internet, or any other connection to electricity, internet, device to device sharing, or a combination thereof. The physical surface may, for example, be a wall, a chalkboard, a dry erase board, stationery, or a combination thereof. People within a physical space (e.g., a room, such as a conference room or office, or another internal or external space regardless of a number of walls) including the physical surface (i.e., in which the physical surface is located) may use a physical surface for various purposes, for example, brainstorming activities, conference discussions, note taking, or creative expression. The use of a physical surface in such ways may in some cases occur during a meeting, which may be exclusive to persons present in the physical space which includes the physical surface or which may include one or more users in a remote space (i.e., remote users), for example, as part of a video conference. For example, the physical space may include a camera with a field of view that includes the location of the physical surface. Remote users may thus view the contents on the physical surface (referred to herein as physical content) throughout the video conference. In some cases, a physical space may have two or more, three or more, or even four or more physical surfaces. However, where the physical surface is merely captured within a general video stream for the physical space (e.g., a single video stream used to visually represent the entire physical space within the video conference) it may be difficult for the remote users to see or otherwise recognize the content of physical surface. Furthermore, this approach in any event renders the remote users unable to edit the contents on the physical surface in order to collaborate, share, or both with the physical users (i.e., the persons who are located in the physical space). Thus, it is desirable to convert content on the physical surface into a virtual whiteboard in order to facilitate collaboration.

A virtual whiteboard is a virtual space within which a number of users, in one or more locations, can collaborate on a project. Users of a virtual whiteboard may collaborate by adding, modifying, and/or removing content (e.g., text boxes, drawing spaces, and sticky notes) for current or future consideration by themselves or others. Users of a virtual whiteboard may access a virtual whiteboard individually, or they may participate in an active virtual whiteboard session (i.e., a real-time event in which a virtual whiteboard is simultaneously accessed by multiple users) to create documents, brainstorm ideas, and otherwise work together towards a project goal. For example, users of a virtual whiteboard may participate in an active virtual whiteboard session via a video conference, in which the remote users of the conference and are able to apply annotations to the virtual whiteboard so that the annotations are shared with the physical users through the video conference to facilitate the active virtual whiteboard session.

A video conference allows contents of a physical surface to be virtually shared in order to facilitate an active virtual whiteboard session that enables video-based, real-time communications between users in one or more locations. In some cases, each of the users separately connects to a video conference from their own remote locations via a remote device. In other cases, multiple users may be physically located in and connect to the video conference from a conference room or similar physical space (e.g., in an office setting) while other conference users connect to the video conference from one or more remote locations. Conferencing software for implementing a video conference thus enables users to conduct video conferences without requiring them to be physically present with one another. The conferencing software may be available as a standalone software product or it may be integrated within a software platform, such as a unified communications as a service (UCaaS) platform.

Users join conferences such as video conferences to ideate, solve problems, teach, learn, share information, communicate, display visual items, or a combination thereof. In some cases, users to a conference may want to utilize a virtual whiteboard which includes content relevant to the conference. However, one or more other users to the conference may not have access to a virtual whiteboard or may not be able to work entirely within the virtual space. For example, a teacher may be located in a physical location and may write on a physical surface. The remote users (e.g., students, teachers, or student teachers) may desire to annotate the physical board, but without being present in the physical room with the physical surface, the remote users are not able to annotate the content of the physical surface. The present teachings provide that the system captures contents of the physical surface with a camera. The content captured is saved along with metadata related to the content.

The metadata may provide a timing of when the content was created, who created the content, a device associated with the content, a user associated with the content, if the content was created on the physical surface, if the content was created virtually, if there were edits to the content, if content was erased, if the content was deleted, subject or topic of the content, or a combination thereof. For example, if multiple topics are covered within on meeting the metadata may allow one of the topics to be retrieved during a subsequent while the other topics are excluded from being shared during the subsequent session. The metadata may be used to sort the content, categorize the content, or both. The contents may then be transmitted based upon a categorization of the contents. A user may provide a topic of interest and the system may categorize the metadata based on that topic and transmit only that topic of interest during a second whiteboard session. The system may convert the contents on the physical surface into contents on a virtual whiteboard. The contents on the virtual whiteboard may then be annotated by the remote users, the physical users, or both. The virtual whiteboard may be recorded in real time or the annotations to the contents may be recorded in a time sequence so that the recording may be played back at a later time. The virtual whiteboard may be recorded based on which user created the annotations so that each annotation may be played back by user at a later time.

The virtual whiteboard including annotations may not be visible to all of the physical users. The virtual whiteboard in its entirety or only annotations to the virtual whiteboard by remote users may be displayed on the physical surface. For example, the physical content may be located on the physical surface and then the annotations may be applied virtually to the physical surface so that the physical surface mirrors the virtual whiteboard. The annotations may be displayed on the physical surface by a projector. The projector may provide the annotations in real time so that the physical users may view the annotations as they are added by the remote users. The projector may project only the annotations made to the physical whiteboard. The projector may project both the physical annotations and the remote annotations on the physical surface. For example, the physical writing may be overlaid by a virtual depiction of the physical writing. The projector may project stored data, converted data, data from a data store, or a combination thereof. The projector may mirror content of the physical surface, virtual annotations, or both. The projector may provide content from a prior session, a current session, a selected content, a selected user, or a combination thereof.

These sessions, which are periods during which activity involving a physical surface occurs and which may involve a physical surface alone or a physical surface and a subject virtual whiteboard, may have multiple users or may not be complete after a first session. However, some or all of the content on the physical surface may be erased or removed between sessions so that the content may no longer be physically available. The present teachings may save the contents, the metadata related to the contents, or both. The present teaching may save the content so that the system may selectively recreate some or all of the content from session to session. A portion of a first session may be recreated during a second session based upon an interest of a user. For example, if a particular topic was not completed during a first session, only that particular topic may be recreated in a second session. The second session may update content elements in a data store. The second session may update a virtual whiteboard based upon annotations to the virtual whiteboard, a physical surface, or both. The data store may contain virtual whiteboard contents from one or more sessions so that the virtual whiteboard contents may be retrieved at a later time. The data store may permanently store the virtual whiteboard contents and the whiteboard software may create temporary storage of the virtual whiteboard contents so that the virtual whiteboard contents are editable in real time before being permanently stored in the data store. All or a portion of the contents may be retrieved from the data store. A subset of the contents may be retrieved. The system during a second session may only reproduce contents from the physical surface (e.g., first physical data) of the first session. The system during the second session may only reproduce contents from remote devices of the first session (e.g., virtual content or virtual annotations).

Every session may be captured in real time and stored in the data store along with the metadata. Every session may be captured during generation. Every session is captured as items are physically generated, virtually generated, or both. The session may be re-creatable in real time. Portions of the session may be recreated virtually if the physical content, virtual content, or both are erased. For example, if the physical surface is cleared, some or all of the contents may be virtually recreated and then shared on the physical surface so that more annotations may be created relative to the contents on the physical surface.

Implementations of this disclosure address problems such as these by collecting metadata and correlating the metadata with contents created on the physical surface, a virtual whiteboard, annotations, or a combination thereof. The metadata may be used to categorize the contents so that the contents may be selectively recreated at a later time or so that a subset of the contents or physical data may be retrieved.

To describe some implementations in greater detail, reference is first made to examples of hardware and software structures used to implement a system for virtually sharing content as annotations onto a physical surface over multiple sessions. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
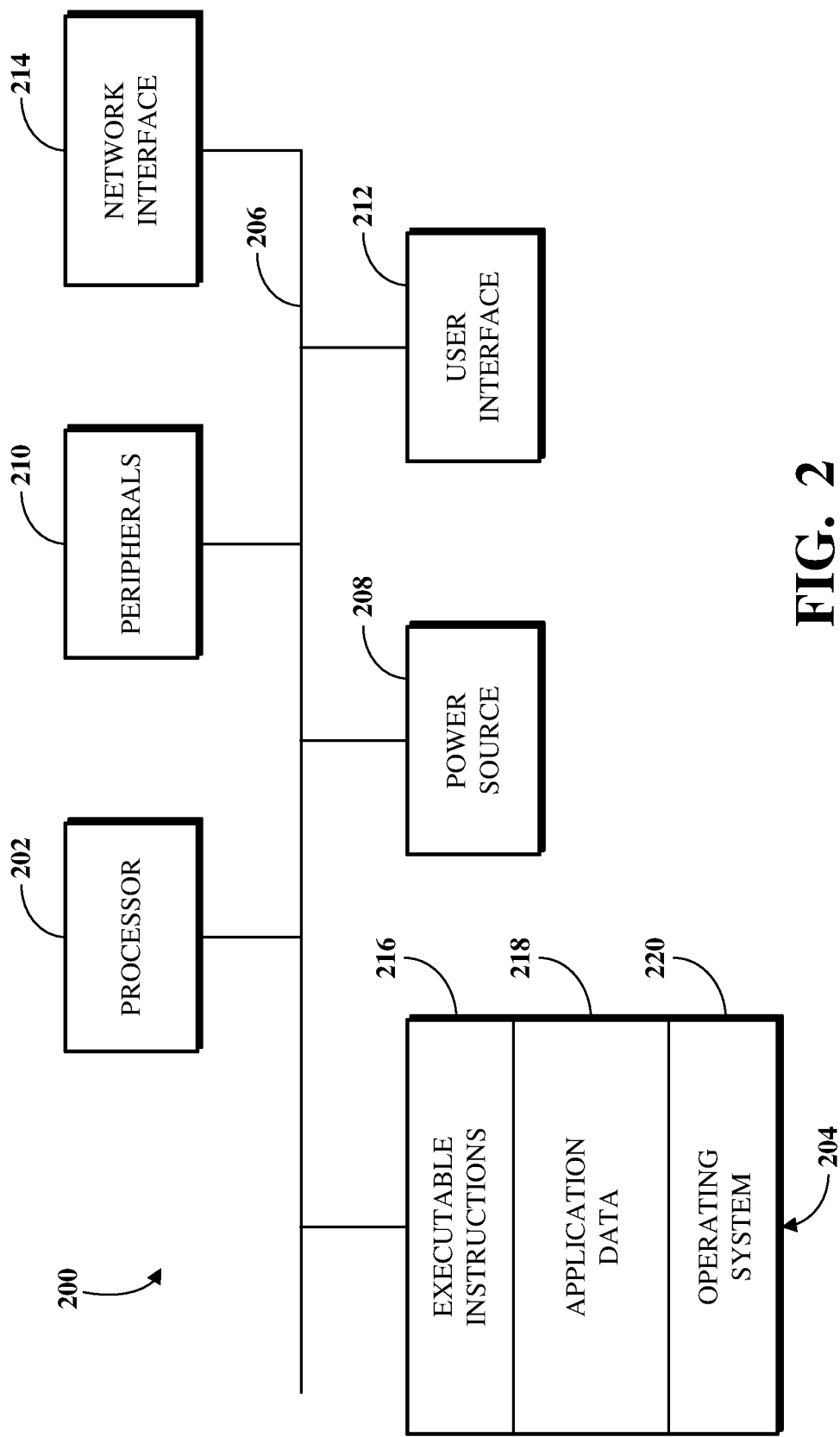
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
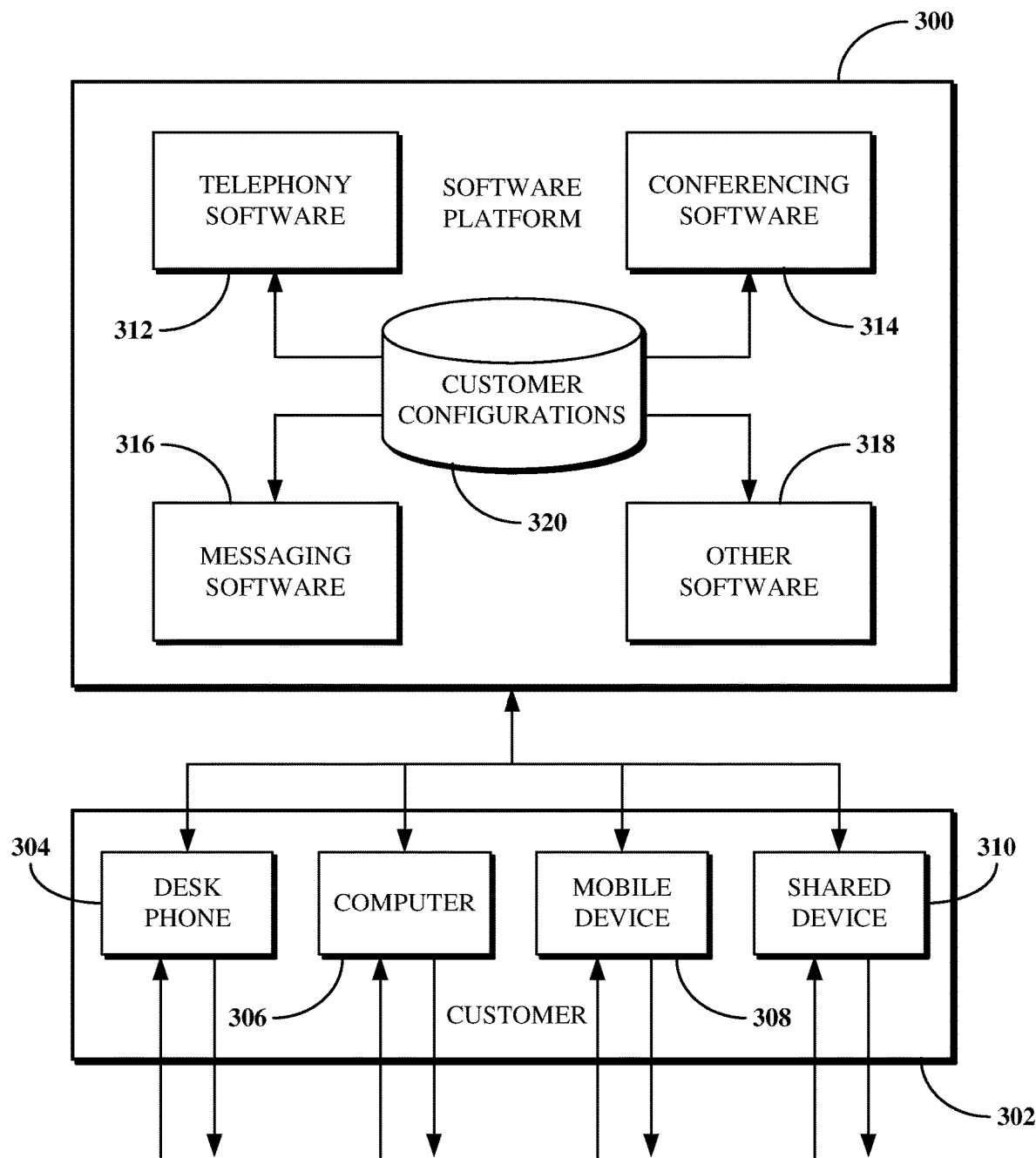
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple users, such as to facilitate a conference between those users. In some cases, the users may all be physically present within a single location, for example, a conference room, in which the conferencing software 314 may facilitate a conference between only those users and using one or more clients within the conference room. In some cases, one or more users may be physically present within a single location and one or more other users may be remote, in which the conferencing software 314 may facilitate a conference between all of those users using one or more clients within the conference room and one or more remote clients. In some cases, the users may all be remote, in which the conferencing software 314 may facilitate a conference between the users using different clients for the users. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include whiteboard software, for example, as or including software for virtually sharing content as annotations onto a physical surface over multiple sessions. The software 318 may convert contents on a physical surface onto a virtual whiteboard. For example, the camera may visibly sense contents of the physical surface, visibly sense movements of a physical user, or both and then virtually recreate the contents of the physical surface. The software 318 may create a virtual whiteboard that is identical to the physical surface, or otherwise introduce the content of the physical surface within a virtual whiteboard, and the remote devices may virtually annotate the virtual whiteboard. The software 318 may, for example, based on user selections of content, project the annotations onto the physical surface so that the virtual annotations (including physical content and/or virtual content) are visible to physical users over one or more different sessions which involve use of the physical surface.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between users and/or other users of the customer 302. In yet another example, the conferencing software 314 may include functionality for file sharing between users and/or other users of the customer 302. In some implementations, some or all of the software 312 through 318 may be combined into a single software application run on clients of the customer, such as one or more of the clients 304 through 310.

Figure 4:
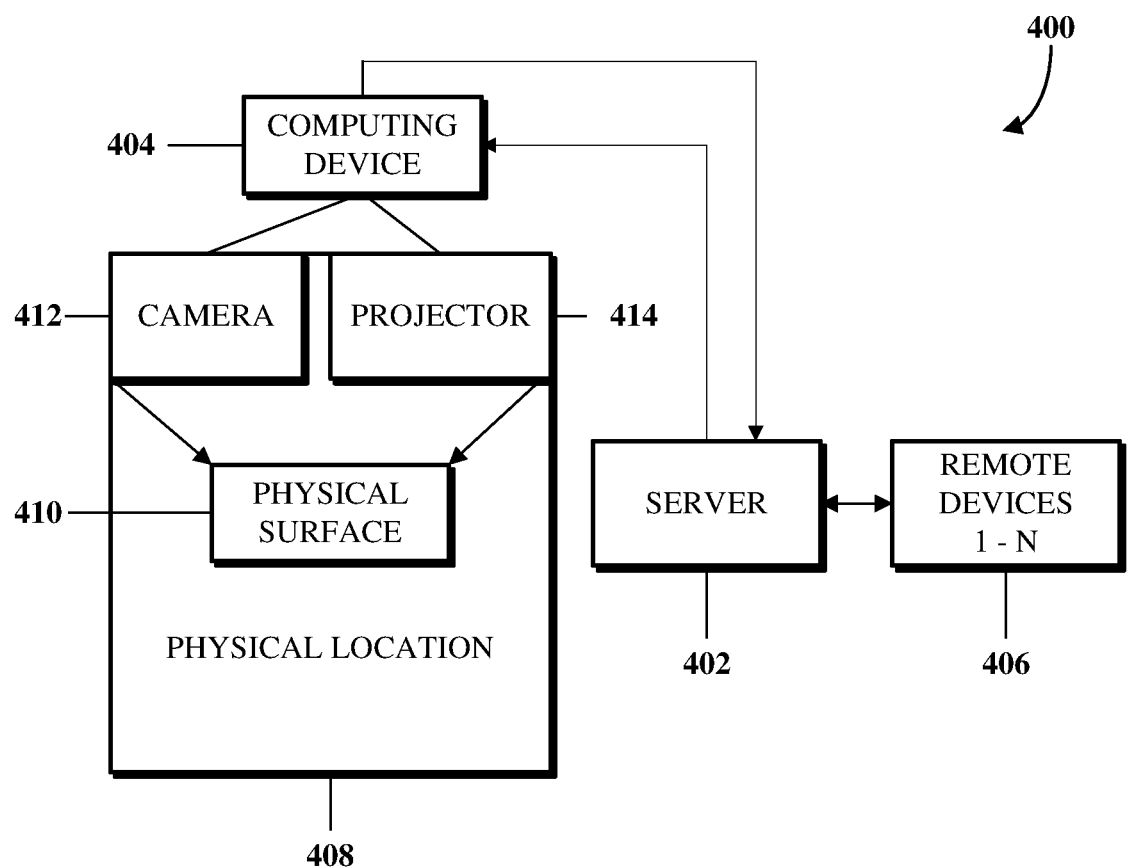
FIG. 4 is a block diagram of a system using a software platform on a server to share physical content.

FIG. 4 is a block diagram of an example of a system 400 for virtually sharing physical content. The system 400 includes a server 402 connected to a computing device 404 and one or more remote devices 406, such as which may be embodied based on the systems, hardware, and software described with respect to FIGS. 1-3. The server 402 executes, interprets, or otherwise runs software that may perform one or more techniques, for example, as described below with respect to FIGS. 7-9. For simplicity of explanation, the system 400 is depicted and described as including the server 402 with whiteboard software herein that may execute a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The computing device 404 is located at (e.g., within or nearby) a physical location 408. The physical location 408 includes a physical surface 410, a camera 412, and a projector 414. The camera 412 and the projector 414 may be aimed at the physical surface 410. The physical location 408 may be any physical space at which one or more people may use the physical surface 410. The physical location 408 may house the physical surface 410, camera 412, projector 414, users, and optionally the computing device 404. During a session, one or more users in the physical location 408 may provide (e.g., add) content on the physical surface 410, for example, by writing or drawing using a marker, pen, or other writing utensil. The content on the physical surface 410 may be shared with the one or more remote devices 406 by the camera 412 capturing images of the physical surface 410 and then by a performance of a computer vision process (e.g., performed at the camera 412, the computing device 404, and/or the server 402) to identify the contents of the physical surface 410 within those images. The output of the computer vision process is data usable to reproduce the contents of the physical surface in a virtual format, for example, within a virtual whiteboard. In particular, the virtual whiteboard may be shared within one or more remote users using the one or more remote devices 406. In this way, the surface enables the virtual sharing of the content of the physical surface 410 with the one or more remote devices 406.

The virtual content may be shared with the one or more remote devices 406 through a screen of the remote devices 406 or some other internet connected media sharing device. For example, the remote users may view and, in at least some cases, interact with (e.g., add to, modify, or delete) some or all of the contents of the physical surface, as captured using the computer vision process, within the virtual whiteboard. Such interactions by the remote users of the one or more remote devices 406 are referred to herein as annotations to the content. To enable the users who are in the physical location 408 to view the annotations, the annotations may be provided by the server 402 (via the whiteboard software running thereat) to the computing device 404. The computing device 404 may then provide the annotations to the projector 414 which can project the annotations onto the physical surface 410 to render the annotations visible by the users at the physical location 408. The server 402 saves the virtual content, the annotations, or both in real time to a data store.

In some implementations, the locations within a virtual whiteboard at which contents based on the physical contents on the physical surface 410 are reproduced may correspond to the relative locations of those physical contents on the physical surface 410. For example, a positional calibration operation may be performed before or during the session to correspond locations of the physical surface 410 with locations of a virtual whiteboard. In one example, a symbol marked upon a defined location (e.g., the middle) of the physical surface 410 may be identified and a corresponding location within the virtual whiteboard may accordingly be identified and verified (e.g., by a user of the virtual whiteboard).

Although a single computing device 404, a single physical surface 410, a single camera 412, and a single projector 414 are shown and described, in some implementations, multiple of one or more of those components may be included in the system 400. For example, the physical location 408 may include multiple physical surfaces and multiple projectors with a single camera (i.e., arranged to have a field of view including all physical surfaces) or multiple cameras (i.e., each arranged to have a field of view including one of the physical surfaces). Where multiple physical surfaces are utilized for a session, the contents of each physical surface may be reproduced within separate virtual whiteboards each corresponding to a different one of the physical surfaces. Alternatively, the contents of all physical surfaces may be reproduced within the same one or more virtual whiteboards. In another example, a first computing device may connect to the camera 412 while a second computing device connects to the server 402 and the projector 414. In such a case, the first computing device can be used for content capture (and in some cases may perform the computer vision process described above) and the second computing device can be used for annotation presentation.

Figure 5:
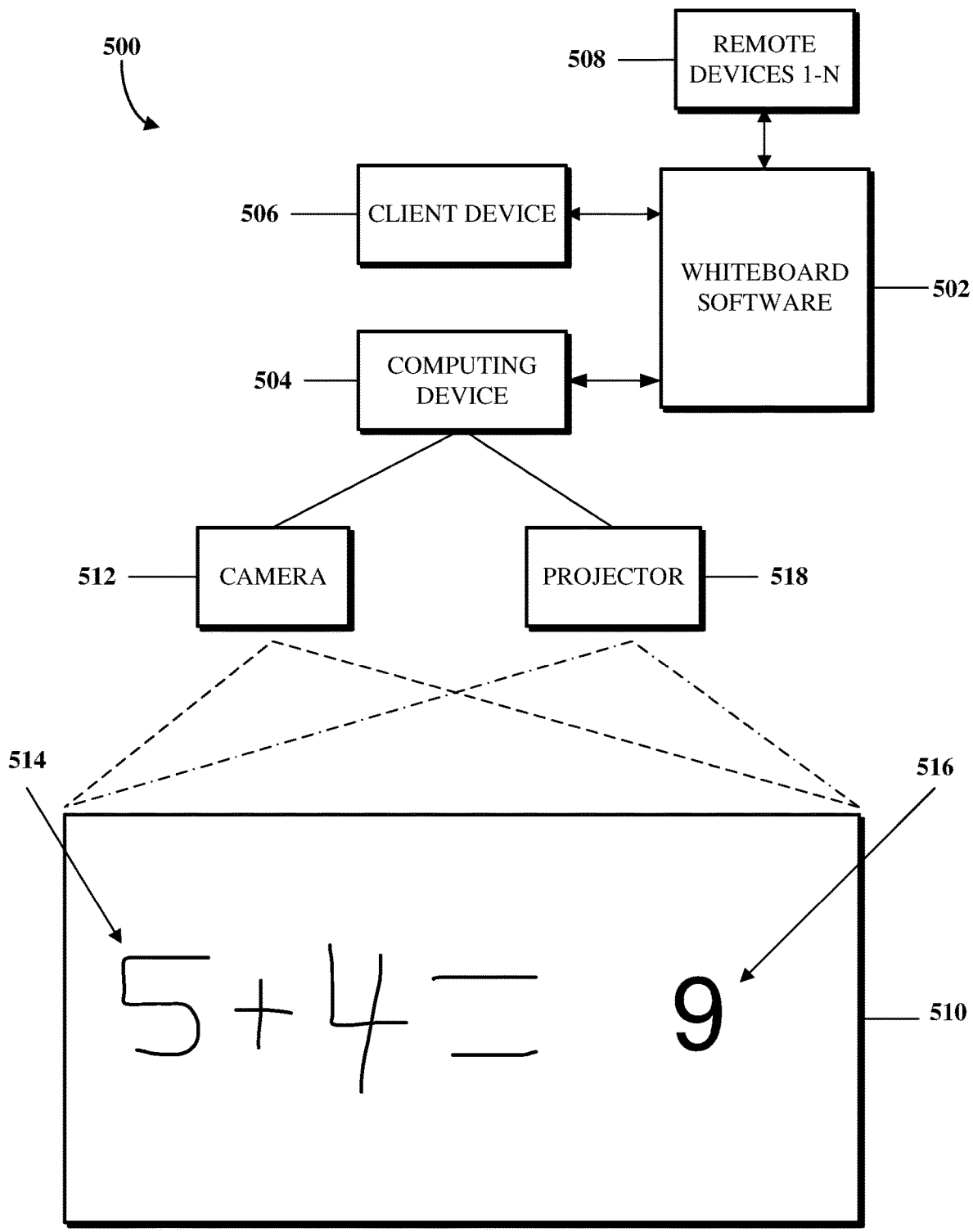
FIG. 5 is a block diagram illustrating the system virtually sharing physical content during a first session.

FIG. 5 is a block diagram of an example of a system 500 during a first session. The system 500 includes whiteboard software 502 that can be executed using computing devices, such as the systems, hardware, servers, and software described with respect to FIGS. 1-4. The whiteboard software 502, while generally described as being run at a server (e.g., the server 402), may be located at a physical location, a remote location, or a combination thereof. The whiteboard software 502 may be in communication with a computing device 504, one or more client devices 506 at a physical location, one or more remote devices 508, or a combination thereof. During a session, a person provides content on the physical surface 510. For example, the system 500 may be the system 400 shown in FIG. 4. In such a case, the whiteboard software 502 may run wholly or partially on the server 402, the computing device 504 may be the computing device 404, the one or more remote devices 508 may be the one or more remote devices 408, and/or the physical surface 510 may be physical surface 410.

The whiteboard software 502, or other software running in connection with the whiteboard software 502, monitors the physical surface 510 in real time via a camera 512 (e.g., the camera 412) that captures physical content 514 on the physical surface 510. The physical content 514 is provided to the whiteboard software 502 through the computing device 504 capturing the physical content 514 with the camera 512. The physical content 514 is converted into virtual content (not shown), as discussed herein, that is shared with the one or more remote devices 508. As the virtual content is provided to the one or more remote devices 508, the users of the one or more remote devices 508 may annotate the virtual content. The annotations 516 may be displayed on the physical surface 510 via a projector 518 (e.g., the projector 414) so that the virtual content and the physical content 514 with the annotations 516 are identically or at least nearly (e.g., in terms of substance and/or aesthetic) identically reproduced.

The projector 518 may display the annotations 516 in real time so that physical users are able to view the annotations 516 in real time. The content (e.g., physical content 514 and annotations 516) on the physical surface 510 may mirror the virtual content so that users in the physical location and the users in the one or more remote locations are all viewing the same content. Users at the physical location may use one or more client devices to view the virtual whiteboard simultaneously with the remote users of the one or more remote devices 508. The client devices 506 may thus permit users at the physical location to participate both virtually and physically with the session. During the session, the whiteboard software 502 captures the physical contents 514 and annotations 516 in real time with the camera 512 and converts the physical contents 514 and annotations 516 into virtual content.

Figure 6:
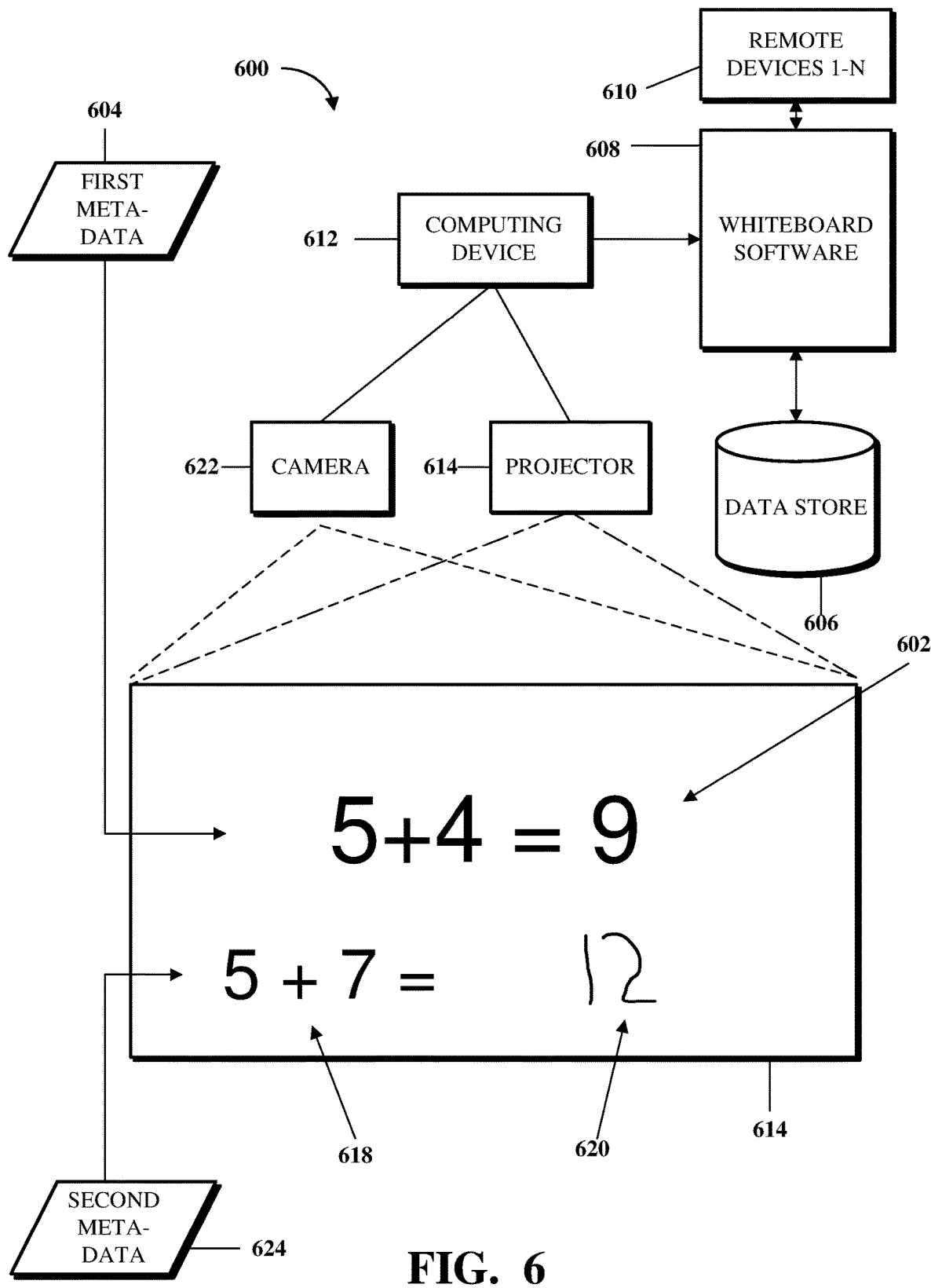
FIG. 6 is a block diagram illustrating a reproduction of the first session of FIG. 5 and further annotating virtual content and physical content of the first session.

FIG. 6 is a block diagram illustrating a system 600 used during a second session that continues with first contents 602 from a first session. The first contents 602 include first metadata 604 that provides information regarding the first contents 602 so that all or a subset of the first contents 602 may be retrieved and provided from a data store 606. The data store 606 or whiteboard software 608 may categorize the first contents 602.

Categorization of the first contents 602 may be based on the first metadata 604 (e.g., stored in and accessed from the data store 606), a user that created the first contents 602, time of creation, what remote device created an annotation, subject matter of the first contents 602, virtually created content, physically created content, or a combination thereof. The first metadata 604 may be saved with specific predetermined categories so that the specific predetermined categories may be categorized at a later time. For example, if ten topics were discussed the metadata may be used to identify each of the ten topics so that a desired topic may be retrieved during a later session based upon the topic and/or tag. The categorization allows for a subset of the first contents 602 to be provided from the data store 606. The whiteboard software 608, a remote device 610, a computing device 612, or a combination thereof may request a subset of contents from the data store 606 so that the second session may focus on the subset of the contents. The categories may be predetermined categories that are provided by the whiteboard software. The users may be able to create the categories within the whiteboard software. Upon a request being received by the data store 606, all or a portion of, the first contents 602 may be provided to the computing device 612. The first contents 602 may be provided from the data store 606 to the whiteboard software 608, the computing device 612, or both. If a subset of data is requested from the data store 606, the information may be provided to the whiteboard software 608 before the information is provided to the computing device 612. If all of the first content 602 is requested then the first content 602 may be directly provided from the data store 606 to the computing device 612. The computing device may provide all or a portion of the first content 602 to a physical surface 614 via a projector 616.

The first contents 602 received from the data store 606 may be provided to the projector 616 and then projected onto the physical surface 614 and provided to the one or more remote devices 610 so that all of the users are able to view the first contents 602. The first contents 602 may provide a starting point for a second session. During the second session, virtual annotations 618 may be added virtually from one of the one or more remote devices 610 and projected on the physical surface 614 by the projector 616.

Physical annotations 620 may be physically added to the physical surface 614. The physical annotations 620 may relate to the virtual annotations 618, as shown. The physical annotations 620, the virtual annotations 618, or both may relate to one another or to the first contents 602. The physical annotations 620 may be captured in real time. The physical annotations 620 may be captured by a camera 622. The camera 622 may capture the physical annotations 620 and communicate the physical annotations 620 to the whiteboard software 608, the data store 606, or both. The whiteboard software 608 may convert the physical annotations 620 into virtual annotations that are provided to the one or more remote devices 610. The camera 622, the computing device 612, the whiteboard software 608, the data store 606, or a combination thereof may save the physical annotations 620, the virtual annotations 618, or both with second metadata 624.

The second metadata 624 (e.g., stored in and accessed from the data store 606) may record predetermined identifying information. The second metadata 624 may record if any information is added or subtracted. The second metadata 624 may record if the information being added or removed is done physically or virtually. The second metadata 624 may determine what remote device 610 provided the virtual annotations, what person provided the physical annotations, if content was added, if content was deleted, if content was modified, a sequence of changes, type of content, subject matter of content, session added or subtracted, topic of content, or a combination thereof. The second metadata 624 may assist in retrieve all or a portion of the first contents 602. The first metadata 604 may merge into the second metadata 624 as the virtual annotations 618 and the physical annotations 620 are made relative to the first contents 602. The first metadata 604 may be retained within the second session or the second metadata may build upon the first metadata. The second metadata 624 may begin new or without the first metadata 604. The second metadata 624 may allow the system 600 to reconstruct all or a portion of the second session or to restore a portion of the second session based on a subset of information gathered with the second metadata 640.

In at least some cases, the system 600 may be the system 500 shown in FIG. 5. For example, the whiteboard software 608 may be the whiteboard software 502, the computing device 612 may be the computing device 504, the one or more remote devices 610 may be the one or more remote devices 508, the physical surface 614 may be the physical surface 510, the camera 622 may be the camera 512, and/or the projector 614 may be the projector 518. In some implementations, the users within the physical location of the physical surface 614 may use one or more client devices (e.g., the client device 406) to access the virtual whiteboard concurrent with the projection of the annotations onto the physical surface 614.

Figure 7:
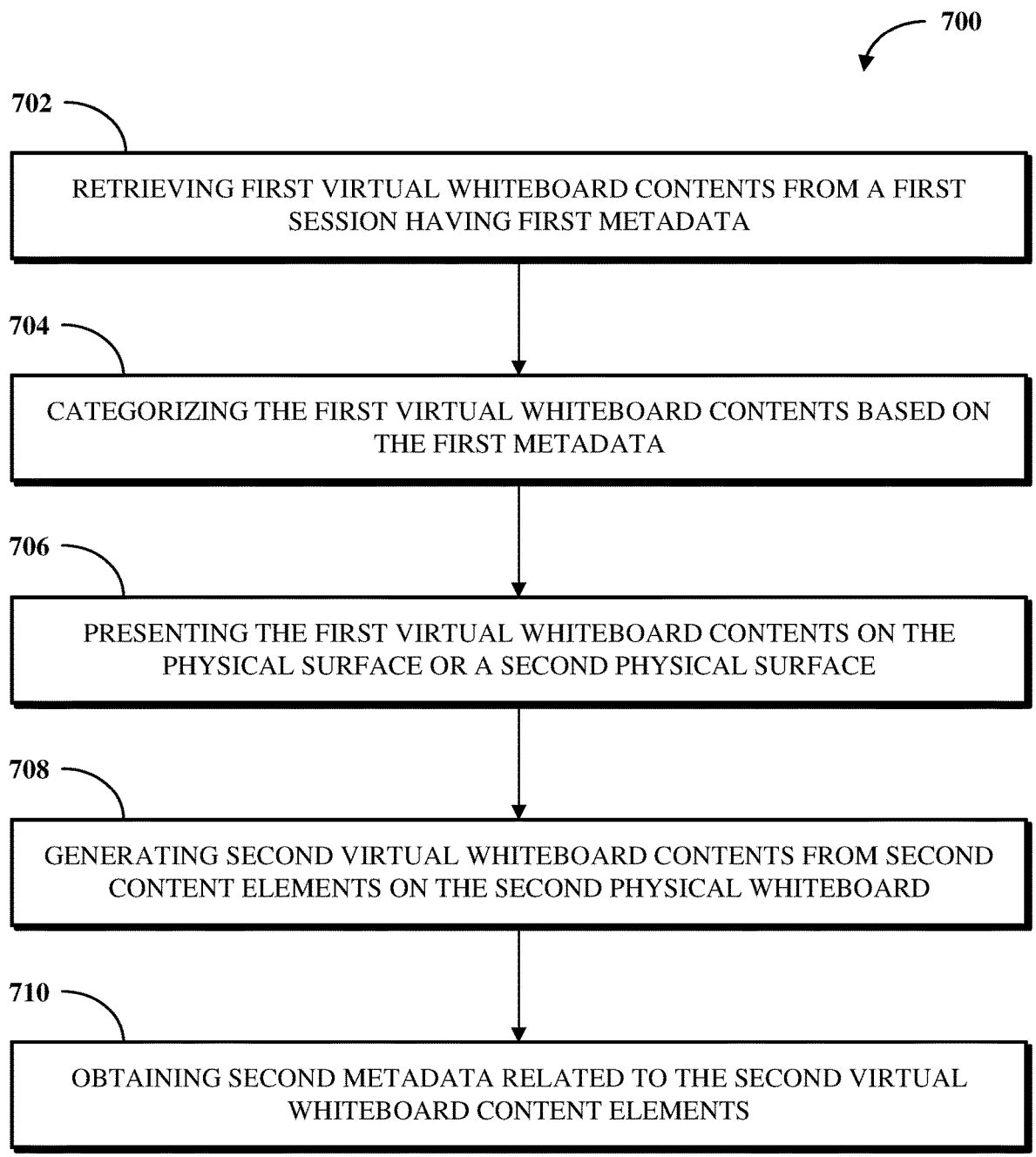
FIG. 7 is a flowchart of an example technique for providing content from a first session at a second session.
Figure 8:
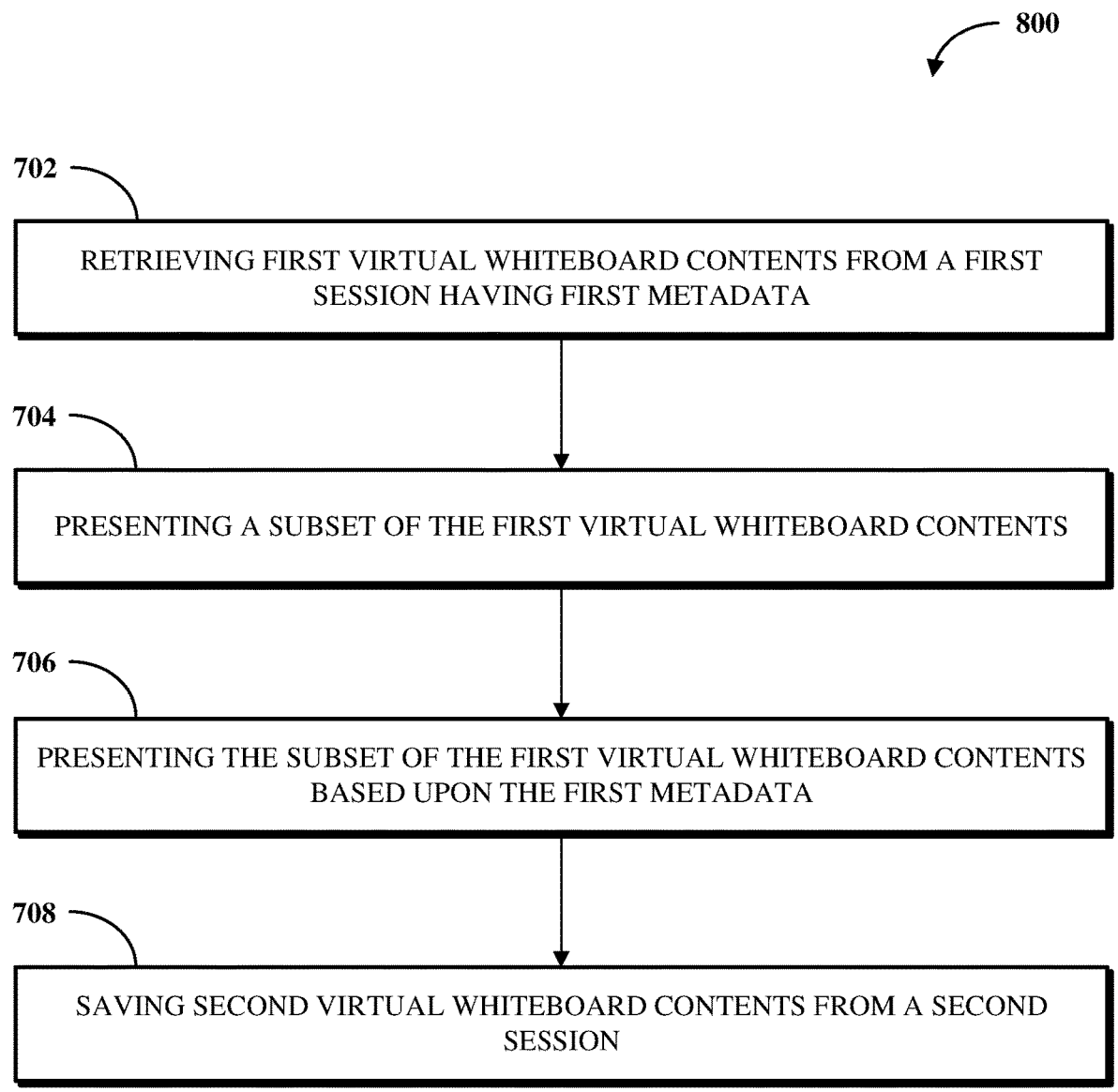
FIG. 8 is a flow chart of an example technique of selectively providing a subset of the content from a first session at a second session.
Figure 9:
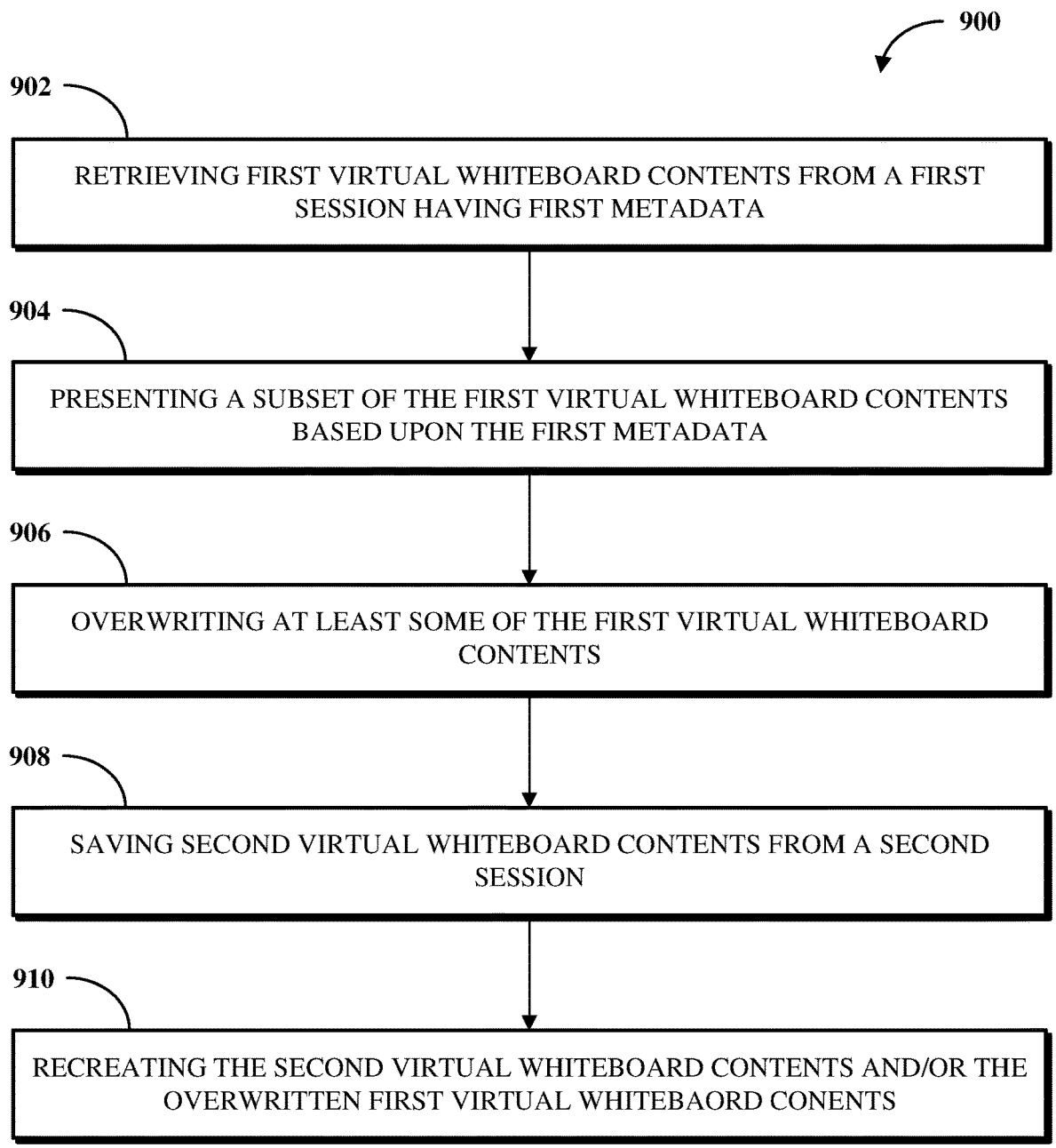
FIG. 9 is a flowchart of an example of a technique to change and recreate content from a current or prior session.

To further describe some implementations in greater detail, reference is next made to examples of techniques which may be performed by or using a server with a software platform that shares physical content on a physical surface with remote users. FIG. 7 is a flowchart of an example of a technique 700 for retrieving contents of a first session and presenting the contents based upon the first metadata. FIG. 8 is a flowchart of an example of a technique 800 for presenting a subset of a first session during a second session. FIG. 9 is a flowchart of an example of a technique 900 for editing a first session during a second session and the recreating all or a portion of the first session after portions of the first session are removed.

The technique 700, the technique 800, and/or the technique 900 can be executed using computing devices, such as the systems, hardware, and software described with respect to FIGS. 1-6. The technique 700, the technique 800, and/or the technique 900 can be performed, for example, by executing a machine-readable program or other computer-executable instructions, such as routines, instructions, programs, or other code. The steps, or operations, of the technique 700, the technique 800, and/or the technique 900 or another technique, method, process, or algorithm described in connection with the implementations disclosed herein can be implemented directly in hardware, firmware, software executed by hardware, circuitry, or a combination thereof.

For simplicity of explanation, the technique 700, the technique 800, and the technique 900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, at 702, contents from the first virtual whiteboard contents are retrieved 702. The virtual whiteboard contents retrieved 702 may relate to a first session. The virtual whiteboard contents retrieved 702 may include first metadata. The first virtual whiteboard contents may be retrieved 702 from a data store. The first virtual whiteboard contents may be retrieved 702 from the data store and then categorized 704 by whiteboard software.

Categorizing 704 may be based on the first metadata. The categorizing 704 may be performed to the first virtual whiteboard contents. Categorizing 704 may be based upon content, user, time, physical annotations, virtual annotations, remote device, computing device, topic, or a combination thereof. Categorization 704 may be checkboxes or categorization manually performed during the first session. For example, each time a new topic begins the whiteboard software may recognize that there is break in the data and a new topic category may begin. In another example, the whiteboard software may recognize that all of the physical contents are being erased and may prompt a user if a new topic is beginning. Categorizing 704 may be based on word recognition by the whiteboard software. Categorizing 704 may permit a subset of contents to be retrieved 702 and then presented 706.

The whiteboard software may categorize 704 the first virtual whiteboard contents and then present 706 all or the subset of the first whiteboard contents on the physical surface or a second physical surface. Presenting 706 the first whiteboard contents may recreate a desired portion of the first session during a second session. Presenting 706 may provide a starting point for a second session. Presenting 706 may virtually present the first whiteboard content, physically present the first whiteboard content, or both. Once the first virtual whiteboard contents are presented 706, new contents may be generated 708 during the second session.

Second contents may be added to the first virtual whiteboard contents and then second virtual whiteboard contents generated 708. The second virtual whiteboard contents may be generated 708 by combining physical contents with virtual components. The second virtual whiteboard comments may be generated 708 by viewing images of a camera, a projector, or both. For example, the remote users may be able to see the physical surface and the virtual whiteboard. The second virtual whiteboard contents may at least in part be generated 708 by converting images of physical shapes and generating virtual content based on those images. Second metadata may be obtained 710 while the second virtual whiteboard content is being generated 708.

Obtaining 710 the second metadata may occur with the physical content, the virtual content, or both. Obtaining 710 the second metadata may capture all of the same information as the first metadata. The second metadata may be obtained 710 starting at the first metadata. The second metadata may obtain 710 all of the same information as the first metadata and may distinguish the first virtual whiteboard contents from the second virtual whiteboard contents. Obtaining 710 the second metadata may result in the second metadata being saved in the data store with the second virtual whiteboard contents so that the second metadata and the second virtual whiteboard contents may be presented at a later date or in a later session.

Referring next to FIG. 8, the technique 800 retrieves 802 first virtual whiteboard contents from a first whiteboard session. Retrieving 802 the first virtual whiteboard contents includes retrieving 802 first metadata. The first metadata may provide characteristics of the first virtual whiteboard contents as discussed herein. The first metadata may be retrieved 802 so that the technique 800 presents 804 a subset of the first virtual whiteboard contents.

The subset may be presented 804 based upon a user, a user device, a remote device, a search term, virtual annotations, physical annotations, topics, date, time, or a combination thereof. The first virtual whiteboard contents may be filtered by the whiteboard software and the subset may be presented 804 during a second session. The subset may presented 804 and then the first metadata may be used to present 806 the subset or to further classify the subset.

The technique may present 806 the subset during a second session once the first metadata is reviewed. Presenting 806 the subset based upon the metadata may provide a second layer of classification. The second classification may be based upon the factors or terms in the first classification such as user, user device, remote device, search term, virtual annotations, physical annotations, topics, date, time, or a combination thereof. The subset may be presented 806 and then a second session may occur.

The second session may result in second virtual whiteboard contents. The second virtual whiteboard contents may be saved 808. The second virtual whiteboard contents may be saved 808 with second metadata. The second virtual whiteboard contents may be saved 808 in a data store. The second virtual whiteboard contents may be saved 808 so that the second virtual whiteboard contents may be retrieved at a later time.

Referring finally to FIG. 9, a second session may begin by retrieving 902 virtual whiteboard contents from a first session. The retrieving 902 may include retrieving 902 the first metadata from the first session. The retrieving 902 may retrieve all or a portion of the first session and the first metadata. The retrieving 902 may result in all or a subset of the first virtual whiteboard contents being presented 904 based upon the first metadata.

The presenting 904 may be a subset as discussed in FIGS. 7 and 8. The subset may be presented 904 based upon categorization, the first metadata or both. Once the subset is presented 904 a second session may begin.

The second session may overwrite 906 some of the first virtual whiteboard contents. Overwriting 906 may generate second virtual whiteboard contents. Overwriting 906 may only overwrite the first virtual whiteboard contents in the second session, in the whiteboard software, or both. The overwriting 906 may not overwrite any of the first virtual whiteboard contents found within the data store. Thus, once a first virtual whiteboard contents are saved in the data store the first virtual whiteboard contents cannot be overwritten 906. The whiteboard software may allow the first virtual whiteboard contents to be overwritten 906 during the second session so that different solutions may be mapped. Overwriting 906 the first virtual whiteboard contents may be removing incorrect data, incorrect assumptions, outdated information, providing new information, changing one or more facts, changing one or more original remarks, or a combination thereof. Overwriting 906 may be adding additional collaborative material, adding on to the existing first virtual whiteboard contents to form second virtual whiteboard contents. Once all or a portion of the first virtual whiteboard contents are overwritten 906 and the second virtual whiteboard contents are generated the second virtual whiteboard contents are saved 908.

The second virtual whiteboard contents may be saved 908 in the data store, with the whiteboard software, on a temporary memory, or a combination thereof. Saving 908 the second virtual whiteboard contents may save 908 second metadata therewith. Saving 908 may include saving 908 the second virtual whiteboard contents so that the second session may be restored to any point in time, restored with regard to a specific contributor (e.g., user that provides content within the second virtual whiteboard contents), restored as to a specific topic, or a combination thereof. Saving 908 may allow multiple different session to begin at different points in time with regards to the first session, the second session, a part of a session, or a combination thereof. Saving 908 may allow the system to create multiple different sessions at multiple different locations so that different meetings may be held to discuss the topics of the sessions. Saving 908 the second virtual whiteboard contents may allow the first virtual whiteboard contents, the second virtual whiteboard contents, or both to be recreated 910 from any time, place, or location within the first session, the second session, or both.

Recreation 910 may allow the system to restart the first session, the second session to be restored or restarted at any time or location, or both. The recreation 910 may allow the current session to restore erased or deleted information virtually in real time. Recreation 910 may allow the system to add information back into the presentation virtually in real time. The recreation 910 may be added based on the first metadata, the second metadata, or both. The recreation 910 may only add back in deleted information within a specified time period, from a point in time, by topic, by user, or a combination thereof. The recreation 910 may allow for removal of unwanted content, reintroduction of removed items, or both. The recreation 910 may provide content with regards to teaching, a category, a specific topic, a specific content, or a combination thereof.

A system of one or more computers can be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. The present teachings include a method. The method includes retrieving, from a data store, all or a portion of virtual whiteboard content derived from a first whiteboard session, where the virtual whiteboard content may include first physical data from a physical surface, first virtual data from a virtual whiteboard, first metadata corresponding to one or both of the first virtual data or the first physical data. The method includes categorizing the retrieved virtual whiteboard content based on the first metadata. The method also includes transmitting a portion of an image stream, selected from the categorization of the virtual whiteboard content, to a client device in a location of the physical surface to cause the image stream to be presented on the physical surface or a second physical surface during a second whiteboard session. The method includes updating the data store with second content elements obtained from the physical surface during the second whiteboard session. The teachings include corresponding computer systems, apparatus, and computer programs recorded on one or more computer storage devices, each configured to perform the actions of the methods.

The teachings may include one or more of the following features. The method may include: obtaining a subset of the first physical data from the virtual whiteboard content based on the first metadata. The first metadata indicates which of a remote user or a remote device provides an annotation to the virtual whiteboard content, the physical surface of the first whiteboard session, or both. The virtual whiteboard content may include physical elements from the physical surface of the first whiteboard session and virtual elements from one or more remote devices in communication with the virtual whiteboard. The method may include: reproducing only the first physical data from the physical surface of the first whiteboard session as the virtual whiteboard of the second whiteboard session. The method may include: overwriting the virtual whiteboard content during annotations in the second whiteboard session to generate second virtual whiteboard content and second metadata. The method may include: capturing a generation of second virtual whiteboard content and contents of the physical surface in real time so that if any of the content of the second physical surface is erased, the content is restorable virtually on the second physical surface. The teachings of the described techniques may include hardware, a method or process, or computer software on a computer-accessible medium.

The present teachings include a non-transitory computer readable medium storing instructions operable to cause one or more processors to perform operations. The non-transitory computer readable medium storing instructions via the one or more processors retrieve, from a data store, all or a portion of virtual whiteboard content derived from a first whiteboard session, where the virtual whiteboard content may include first physical data from a physical surface, first virtual data from a virtual whiteboard, first metadata corresponding to one or both of the first virtual data or the first physical data; categorize the retrieved virtual whiteboard content based on the first metadata; transmit a portion of an image stream, selected from the categorization of the retrieved virtual whiteboard content, to a client device in a location of the physical surface to cause the image stream to be presented on the physical surface or a second physical surface during a second whiteboard session; and update the data store with second content elements obtained from the physical surface during the second whiteboard session. Other teachings of this aspect include corresponding computer systems, apparatus, and computer programs recorded on one or more computer storage devices, each configured to perform the actions of the methods.

Teachings may include one or more of the following features. The non-transitory computer readable medium where the one or more processors are configured to retrieve a subset of the first physical data from the virtual whiteboard content based on the first metadata. The first metadata includes information related to which of a remote user or a remote device provides an annotation, the physical surface, content, topics, or a combination thereof. The virtual whiteboard content may include physical elements from the physical surface of the first whiteboard session and virtual elements on the physical surface. The processor recreates content that is removed from the physical whiteboard, the second physical whiteboard, or both that has been removed or erased during the second session. The first virtual whiteboard contents are overwritten during the second session and are saved to the data store as a second virtual whiteboard session. The one or more processors may include whiteboard software that is configured to generate second virtual whiteboard in real time. The techniques may include hardware, a method or process, or computer software on a computer-accessible medium.

The apparatus includes a memory. The apparatus includes a processor configured to execute instructions stored in the memory to: retrieve, from a data store, all or a portion of virtual whiteboard content derived from a first whiteboard session, where the virtual whiteboard content may include first physical data from a physical surface, first virtual data from a virtual whiteboard, first metadata corresponding to one or both of the first virtual data or the first physical data; categorize the retrieved virtual whiteboard content based on the first metadata; transmit a portion of an image stream, selected from the categorization of the first metadata, to a client device in a location of the physical surface to cause the image stream to be presented on the physical surface or a second physical surface during a second whiteboard session; and update the data store with second content elements obtained from the physical surface during the second whiteboard session. The teachings include corresponding computer systems, apparatus, and computer programs recorded on one or more computer storage devices, each configured to perform the actions of the methods.

The teachings may include one or more of the following features. The apparatus may include: whiteboard software configured to convert the first physical data from the physical surface into the first virtual data. The apparatus may include: whiteboard software configured to overwrite the retrieved virtual whiteboard content so that the retrieved virtual whiteboard content is converted into second virtual whiteboard content. The apparatus may include: whiteboard software configured to recreate content created deleted during the second whiteboard session. The second virtual whiteboard content when erased is recreatable in real time virtually on the physical surface of the second physical surface during the second session. The apparatus may include: whiteboard software configured to connect physical users with remote devices in real time. The techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   retrieving, from a data store, all or a portion of virtual whiteboard content derived from a first whiteboard session, wherein the virtual whiteboard content comprises first physical data from a physical surface, first virtual data from a virtual whiteboard, and first metadata corresponding to one or both of the first virtual data or the first physical data, the first metadata comprising: a timing of when the first virtual data was created, a timing of when the first physical data was created, who created the first virtual data, who created the first physical data, or a combination thereof;
   categorizing the retrieved virtual whiteboard content based on the first metadata;
   storing the virtual whiteboard content of the first virtual whiteboard session, including content that is removed, in the data store in response to the removal of the content;
   recreating the removed content to enable annotation of the removed content is able to be annotated during a second virtual whiteboard session;
   transmitting a portion of an image stream, selected from the categorization of the retrieved virtual whiteboard content, including the removed content categorized with the first metadata, to a client device in a location of the physical surface to cause the image stream to be presented on the physical surface or a second physical surface during a second whiteboard session; and
   updating the data store with second content elements obtained from the physical surface during the second whiteboard session.

2. The method of claim 1, comprising:
   obtaining a subset of the first physical data from the virtual whiteboard content based on the first metadata.

3. The method of claim 1, wherein the first metadata indicates which of a remote user or a remote device provides an annotation to the virtual whiteboard content, the physical surface of the first whiteboard session, or both.

4. The method of claim 1, wherein the virtual whiteboard content comprises physical elements from the physical surface of the first whiteboard session and virtual elements from one or more remote devices in communication with the virtual whiteboard.

5. The method of claim 1, comprising:
   reproducing only the first physical data from the physical surface of the first whiteboard session as the virtual whiteboard of the second whiteboard session.

6. The method of claim 1, further comprising:
   overwriting the virtual whiteboard content during annotations in the second whiteboard session to generate second virtual whiteboard content and second metadata.

7. The method of claim 1, further comprising:
capturing a generation of second virtual whiteboard content and contents of the physical surface in real time so that if any of the content of the second physical surface is erased, the content is restorable virtually on the second physical surface.

8. A non-transitory computer readable medium storing instructions operable to cause one or more processors to perform operations comprising:
retrieve, from a data store, all or a portion of virtual whiteboard content derived from a first whiteboard session, wherein the virtual whiteboard content comprises first physical data from a physical surface, first virtual data from a virtual whiteboard, first metadata corresponding to one or both of the first virtual data or the first physical data, the first metadata comprising: a timing of when the first virtual data was created, a timing of when the first physical data was created, who created the first virtual data, who created the first physical data, or a combination thereof;
categorize the retrieved virtual whiteboard content based on the first metadata;
store the virtual whiteboard content of the first virtual whiteboard session, including content that is removed, in the data store in response to the removal of the content;
recreate the removed content to enable annotation of the removed content is able to be annotated during a second virtual whiteboard session;
transmit a portion of an image stream, selected from the categorization of the retrieved virtual whiteboard content, including the removed content categorized with the first metadata, to a client device in a location of the physical surface to cause the image stream to be presented on the physical surface or a second physical surface during a second whiteboard session; and
update the data store with second content elements obtained from the physical surface during the second whiteboard session.

9. The non-transitory computer readable medium of claim 8, wherein the one or more processors are configured to retrieve a subset of the first physical data from the virtual whiteboard content based on the first metadata.

10. The non-transitory computer readable medium of claim 8, wherein the first metadata includes information related to which of a remote user or a remote device provides an annotation, the physical surface, content, topics, or a combination thereof.

11. The non-transitory computer readable medium of claim 8, wherein the virtual whiteboard content comprises physical elements from the physical surface of the first whiteboard session and virtual elements on the physical surface.

12. The non-transitory computer readable medium of claim 8, wherein the processor recreates content that is removed from the physical whiteboard, the second physical whiteboard, or both that has been removed or erased during the second session.

13. The non-transitory computer readable medium of claim 8, wherein the first virtual whiteboard contents are overwritten during the second session and are saved to the data store as a second virtual whiteboard session.

14. The non-transitory computer readable medium of claim 8, wherein the one or more processors comprise whiteboard software that is configured to generate asecond virtual whiteboard in real time.

15. An apparatus comprising:
a memory; and
a processor configured to execute instructions stored in the memory to:
retrieve, from a data store, all or a portion of virtual whiteboard content derived from a first whiteboard session, wherein the virtual whiteboard content comprises first physical data from a physical surface, first virtual data from a virtual whiteboard, first metadata corresponding to one or both of the first virtual data or the first physical data, the first metadata comprising: a timing of when the first virtual data was created, a timing of when the first physical data was created, who created the first virtual data, who created the first physical data, or a combination thereof;
categorize the retrieved virtual whiteboard content based on the first metadata;
store the virtual whiteboard content of the first virtual whiteboard session, including content that is removed, in the data store in response to the removal of the content;
recreate the removed content to enable annotation of the removed content is able to be annotated during a second virtual whiteboard session;
transmit a portion of an image stream, selected from the categorization of the first metadata, including the removed content categorized with the first metadata, to a client device in a location of the physical surface to cause the image stream to be presented on the physical surface or a second physical surface during a second whiteboard session; and
update the data store with second content elements obtained from the physical surface during the second whiteboard session.

16. The apparatus of claim 15, further comprising:
whiteboard software configured to convert the first physical data from the physical surface into the first virtual data.

17. The apparatus of claim 15, further comprising:
whiteboard software configured to overwrite the retrieved virtual whiteboard content so that the retrieved virtual whiteboard content is converted into second virtual whiteboard content.

18. The apparatus of claim 15, further comprising:
whiteboard software configured to recreate content that was created and was deleted during the second whiteboard session.

19. The apparatus of claim 15, wherein the second virtual whiteboard content when erased is recreatable in real time virtually on the physical surface of the second physical surface during the second session.

20. The apparatus of claim 15, further comprising:
whiteboard software configured to connect physical users with remote devices in real time.

* * * * *